(12) United States Patent
Craig et al.

(10) Patent No.: US 10,207,363 B2
(45) Date of Patent: Feb. 19, 2019

(54) ADDITIVE MANUFACTURING TEMPERATURE CONTROLLER/SENSOR APPARATUS AND METHOD OF USE THEREOF

(71) Applicants: James Eldon Craig, Lake Forest, CA (US); Thomas Ross Wakeman, Buffalo, NY (US)

(72) Inventors: James Eldon Craig, Lake Forest, CA (US); Thomas Ross Wakeman, Buffalo, NY (US)

( * ) Notice: Subject to any disclaimer, the term of this patent is extended or adjusted under 35 U.S.C. 154(b) by 704 days.

(21) Appl. No.: 14/665,983

(22) Filed: Mar. 23, 2015

(65) Prior Publication Data

US 2015/0268099 A1    Sep. 24, 2015

Related U.S. Application Data

(60) Provisional application No. 61/969,584, filed on Mar. 24, 2014.

(51) Int. Cl.
*B23K 26/03*     (2006.01)
*G01J 5/00*      (2006.01)
(Continued)

(52) U.S. Cl.
CPC ............ *B23K 26/034* (2013.01); *B33Y 10/00* (2014.12); *B33Y 30/00* (2014.12); *B33Y 50/02* (2014.12);
(Continued)

(58) Field of Classification Search
CPC ............ G01K 7/02; G01K 3/005; G01K 3/10; G01K 7/42; G01K 7/22; G01K 13/02; G01K 2205/04; G01K 2013/024; G01K 7/16; G01K 7/01; G01K 7/10; G01K 11/32; G01K 13/00; B23K 31/02; G01F 1/00; G01N 25/72; G01N 25/28; G01N 25/32; G01N 33/225; G01N 33/02; H05K 7/20945; F24F 11/0012; F24F 2001/0052; F24F 2011/0093; F24F 11/002; H02M 1/32; H02M 1/38; H02M 1/53806; H01C 7/008;
(Continued)

(56) References Cited

U.S. PATENT DOCUMENTS

| | | | |
|---|---|---|---|
| 2005/0064583 A1* | 3/2005 | Caruso | A61L 2/0011 435/287.2 |
| 2015/0041656 A1* | 2/2015 | Novotny | G01J 3/42 250/339.02 |

OTHER PUBLICATIONS

Yu.Chivel, I. Smurov, On-line temperature monitoring in selective laser sintering/melting, Science Direct Physics Procedia, 2010, pp. 515-521, Elsevier, France.

* cited by examiner

*Primary Examiner* — Manish S Shah
(74) *Attorney, Agent, or Firm* — Kevin Hazen

(57) ABSTRACT

An additive manufacturing temperature controller/temperature sensor uses one or more spectrophotometric sensors to monitor temperature of successive layers and preferably localized sections of successive layers of a melt pool, and transients thereof, of an object being generated for the purpose of dynamic control of the additive manufacturing device and/or quality control of the generated object manufactured with the additive manufacturing device. Generally, the additive manufacturing temperature controller/sensor apparatus monitors temperature of a section of the object during manufacture as a function of wavelength, time, position, and/or angle to determine melt extent in terms of radius and/or depth.

9 Claims, 6 Drawing Sheets

(51) Int. Cl.
  *G01J 5/60* (2006.01)
  *B33Y 30/00* (2015.01)
  *B33Y 10/00* (2015.01)
  *B33Y 50/02* (2015.01)
  B23K 103/08 (2006.01)
  G01J 5/10 (2006.01)
  B29C 64/135 (2017.01)
  B29C 64/386 (2017.01)

(52) U.S. Cl.
  CPC .............. *G01J 5/0003* (2013.01); *G01J 5/004* (2013.01); *G01J 5/602* (2013.01); *B23K 2103/08* (2018.08); *B29C 64/135* (2017.08); *B29C 64/386* (2017.08); *G01J 2005/106* (2013.01); *G01J 2005/607* (2013.01)

(58) Field of Classification Search
  CPC ........ H01C 17/00; H01R 4/023; H01R 4/029; H01R 43/28; G01R 31/2642; G01R 31/048; G01R 31/40; G01J 5/004; G01J 5/00; G01J 5/003; G01J 5/043; G01J 5/0821; A47J 43/287; F16B 2/02; F16B 1/00; F16B 47/00; F16B 2001/0035; F16M 13/02; F16M 13/022
  See application file for complete search history.

ADDITIVE MANUFACTURING TEMPERATURE CONTROLLER/SENSOR APPARATUS AND METHOD OF USE THEREOF

CROSS REFERENCES TO RELATED APPLICATIONS

This application claims benefit of U.S. provisional patent application Ser. No. 61/969,584, filed Mar. 24, 2014, which is incorporated herein in its entirety by this reference thereto.

BACKGROUND OF THE INVENTION

Field of the Invention

The invention relates generally to an additive manufacturing system.

Discussion of the Prior Art

Additive Manufacturing

Additive manufacturing or 3-dimensional printing is an additive process of laying down successive layers of different shapes to form a three-dimensional solid object shape. Additive manufacturing is useful for: rapid-prototyping, localized manufacturing, distributed manufacturing, and/or mass customization in research, industrial, domestic, and/or hobbyist use.

Problem

There exists in the art of additive manufacturing a need for enhanced quality control.

SUMMARY OF THE INVENTION

The invention comprises an additive manufacturing temperature controller/sensor apparatus and method of use thereof.

DESCRIPTION OF THE FIGURES

A more complete understanding of the present invention is derived by referring to the detailed description and claims when considered in connection with the Figures, wherein like reference numbers refer to similar items throughout the Figures.

Elements and steps in the figures are illustrated for simplicity and clarity and have not necessarily been rendered according to any particular sequence. For example, steps that are performed concurrently or in different order are illustrated in the figures to help improve understanding of embodiments of the present invention.

DETAILED DESCRIPTION OF THE INVENTION

The invention comprises an additive manufacturing temperature sensor/temperature controller apparatus and method of use thereof.

In one embodiment, the additive manufacturing temperature sensor uses a controller and/or a spectrophotometric sensor to monitor temperature of successive layers and preferably localized sections of successive layers for the purpose of dynamic control of the additive manufacturing device and/or quality control of the generated object manufactured with the additive manufacturing device. Generally, the additive manufacturing temperature controller/sensor apparatus monitors temperature of a section of the object during manufacture as a function of wavelength, time, position, and/or angle to determine melt extent in terms of radius and/or depth. Examples provided, infra, are non-limiting examples used to clarify the invention.

Herein, for clarity of presentation, non-limiting examples of an additive printer are provided where deposited material is a metal or a form of a metal and the resulting product is a metal object. However, the technology is also applicable to any additive printer system, such as an additive printer depositing a form of a plastic and/or a mixture of a low temperature melt material and a higher temperature melt material, where the lower and higher temperature differ by greater than 10, 50, 100, 200, or 500 degrees Celsius.

Axes

Herein, for clarity of presentation, an x-axis and a y-axis form a horizontal x/y-plane and a z-axis is aligned perpendicular or normal to the x/y-plane, such as aligned with gravity. However, the elements described herein optionally use any localized three-dimensional axis system.

Additive Manufacturing Device

Figure 1:
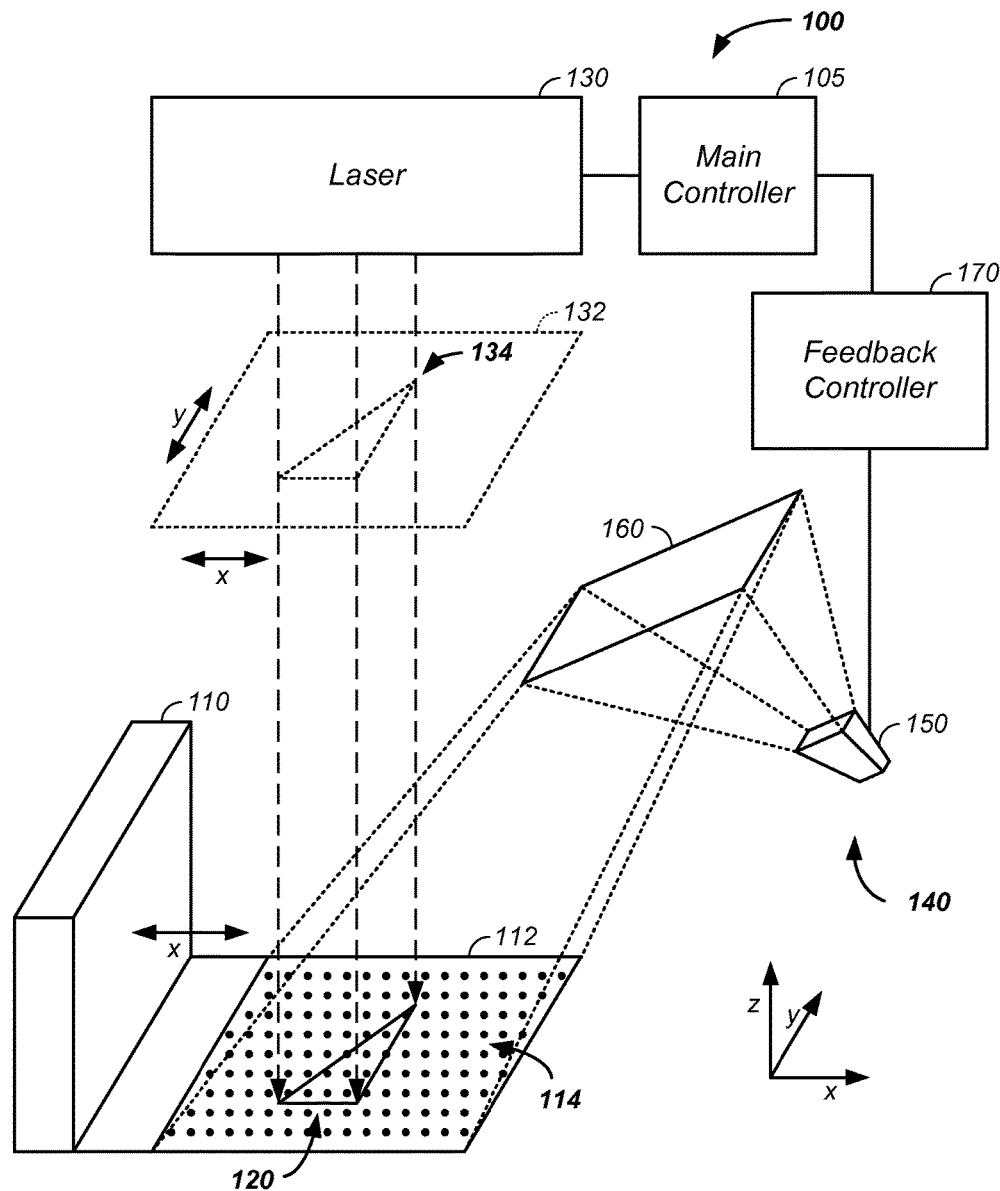
FIG. 1 illustrates an additive manufacturing metal printer.

Referring now to FIG. 1, select elements of an exemplary additive manufacturing device 100 are illustrated. Generally, the additive manufacturing device 100 includes: a main controller 105, which controls a screed 110 that deposits a material 114, represented graphically as dots in FIG. 1, to a working platform 112 and a laser 130 that selectively targets positions of the material 114 to form an object 120. The additive manufacturing temperature sensor apparatus, referred to herein as a temperature controller 140, uses a spectrophotometric temperature sensor 150 and optionally one or more intervening optics 160 to sense temperature of at least a portion of the object 120 on the working platform 112. One or more elements of the temperature controller 140 are used in control of one or more elements of the additive manufacturing device 100. The temperature controller 140 is optionally integrated into or partially integrated into the additive manufacturing device 100. Each of the elements are further described, infra.

Referring still to FIG. 1, in use the additive manufacturing device 100 translates the screed 110, such as along the x-axis, across the working platform 112. As the screed 110 translates, the screed 110 deposits and/or selectively deposits the material 114 on the working platform, onto a previous deposition layer, and/or onto the object 120 being formed. The material is optionally a working material, such as metal powder for subsequent fusing by the laser 130 and/or a support material intended to support the object 120 during creation, where the support material is optionally and preferably later removed. The laser 130 selectively targets and/or sinters sections, pixels, and/or voxels of the material 114 to form sub-layers of the object 120. Optionally, in targeting the sub-layer of the material 114, the laser 130 uses an f-theta lens for even power distribution and/or uniform targeting size of the laser beam across the x/y-plane. A preferred material an austenitic nickel-chromium-based superalloy, such as an Inconel® (Special Metals Corporation, New Hartford, N.Y.) material with a melting point of 1400° C. However, any metal or metal alloy material is used, such as a metal containing 0 to 80 percent nickel; 0 to 40 percent chromium, 0 to 20 percent iron, molybdenum, and/or cobalt; and/or 0 to 10 percent of one or more of niobium, manganese, copper, aluminum, titanium, silicon, carbon, sulfur, phosphorus, and boron, where the metal is in any atomic and/or any ionic form. The preferred material has a melting point of greater than 500, 750, 1000, 1250, or 1500° C., but optionally has a melting point of greater than 100, 150, or 200° C. The laser 130 is figuratively illustrated as targeting a portion of a sub-layer 132, such as an object sub-layer 134 of the object 120, where the sub-layer is represented as a triangle but is any geometric shape. More generally, the laser selectively heats portions of an x,y-plane at a relative z-height, where the z-height increases with subsequent layers. The temperature controller 140 monitors the x/y-plane being heated by the laser 130 to form a two-dimensional temperature profile, $T_{(x,y)}$, which is further described infra.

Figure 2:
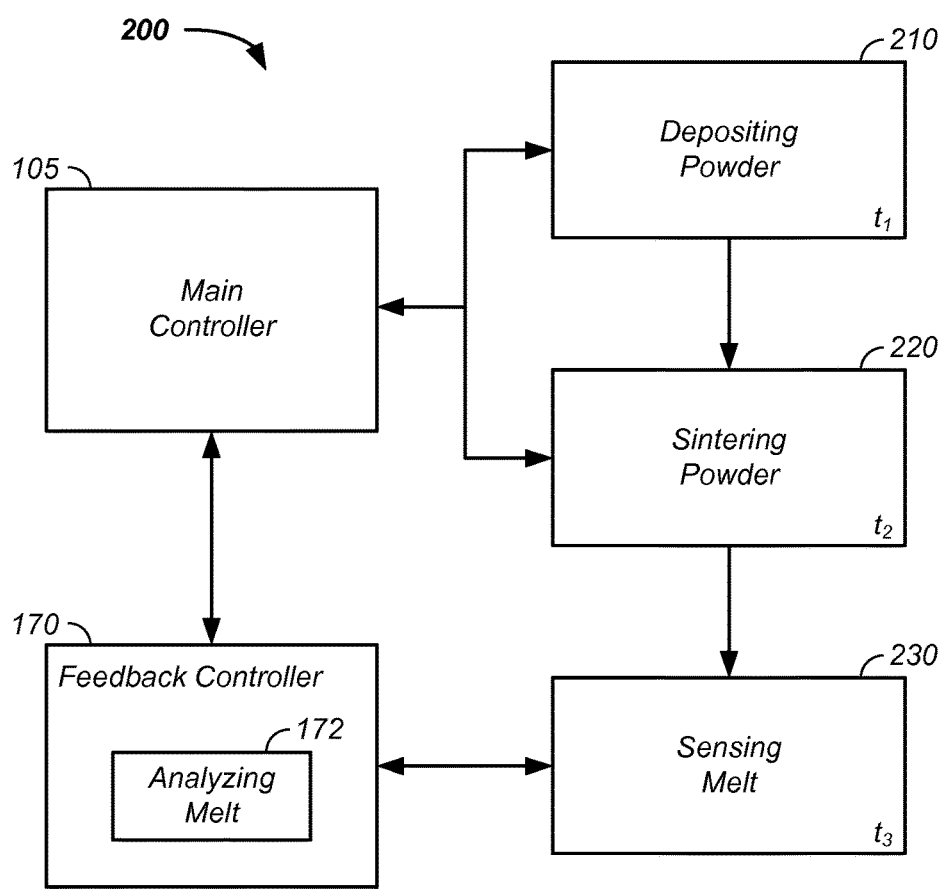
FIG. 2 illustrates a process of additive manufacturing control.

Still referring to FIG. 1 and referring now to FIG. 2, a method of manufacturing 200 using the additive manufacturing device 100 and temperature controller 140 is described. The method of manufacturing 200 preferably uses a feedback controller 170 in control of one or more of the steps of: (1) depositing the powder 210, such as with the screed 110; (2) melting or sintering the powder 220, such as with the laser 130; and/or (3) sensing the melt 230, such as with the spectrophotometric sensor 150. The feedback controller 170 is optionally a computer embedded device and is preferably integrated with the main controller 105. Preferably the feedback controller 170 uses one or more subroutines in a process of analyzing the melt 172. The feedback controller 170 is optionally and preferably linked to the additive manufacturing device 100 and/or a main controller 105 of the manufacturing device 100 in a feedback loop. The main controller 105 and the feedback controller 170 are further described, infra. Based upon input from the feedback controller 170, the additive manufacturing device: discards an unacceptable instance of the object 120, accepts the completed object, continues to heat identified portions of the material, such as through the step of melting the powder 220, or initiates a new sub-layer, such as through a new instance of the depositing powder step 210.

Referring again to FIG. 1 and FIG. 2, the additive manufacturing device 100 is optionally multiplexed. For example, more than one screed 110 is optionally used in the formation of a single layer of the object 120. Similarly, more than 1, 2, 3, 4, 5, 10, or 15 distinct materials are optionally deposited in each of greater than 1, 2, 3, 4, 5, 10, 20, 50, 100, 500, or 1000 layers. Further, more than one laser is optionally used in the treatment of a single layer, where the more than one laser optionally includes multiples of a single laser type, a set of lasers lasing more than one frequency, and/or a tunable laser, such as tunable diode laser. For clarity of presentation, one screed is illustrated depositing one or two materials, such as a working material and a support matrix material and one laser is used to join particles and/or sections of the deposited material(s). However, any number of screeds, materials, and/or lasers are optionally used in series and/or in parallel to form a single object or set of objects.

Client

The main controller 105 and/or the feedback controller 170, for clarity of presentation referred to herein as the controller, optionally comprises one or more subsystems stored on a client. The client is a computing platform configured to act as a client device or other computing device, such as a computer, personal computer, a digital media device, and/or a personal digital assistant. The client comprises a processor that is optionally coupled to one or more internal or external input device, such as a mouse, a keyboard, a display device, a voice recognition system, a motion recognition system, or the like. The processor is also coupled to an output device, such as a display screen or data link to display or send data and/or processed information, respectively. In one embodiment, the controller is the processor. In another embodiment, the controller is a set of instructions stored in memory that is carried out by the processor.

The client includes a computer-readable storage medium, such as memory. The memory includes, but is not limited to, an electronic, optical, magnetic, or another storage or transmission data storage medium capable of coupling to a processor, such as a processor in communication with a touch-sensitive input device linked to computer-readable instructions. Other examples of suitable media include, for example, a flash drive, a CD-ROM, read only memory (ROM), random access memory (RAM), an application-specific integrated circuit (ASIC), a DVD, magnetic disk, an optical disk, and/or a memory chip. The processor executes a set of computer-executable program code instructions stored in the memory. The instructions may comprise code from any computer-programming language, including, for example, C originally of Bell Laboratories, C++, C#, Visual Basic® (Microsoft, Redmond, Wash.), Matlab® (MathWorks, Natick, Mass.), Java® (Oracle Corporation, Redwood City, Calif.), and JavaScript® (Oracle Corporation, Redwood City, Calif.).

Herein, the system main controller 105 and/or the feedback controller 170 refers to a single system controlling the additive manufacturing device 100, to a single controller controlling a plurality of subsystems controlling the additive manufacturing device 100, or to a plurality of individual controllers controlling one or more sub-systems of the additive manufacturing device 100.

Temperature Controller

Figure 3:
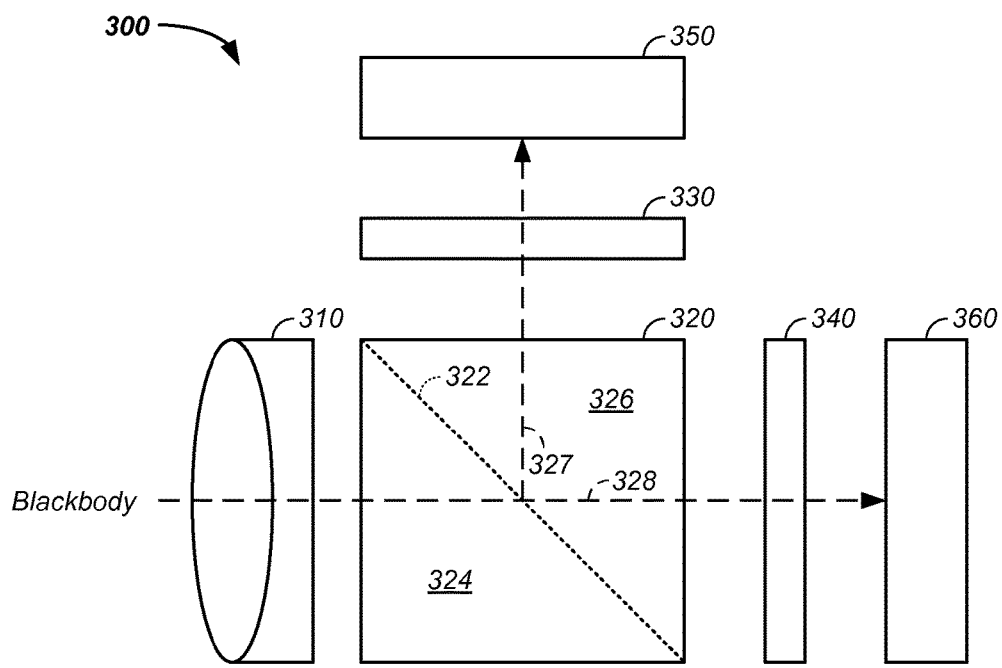
FIG. 3 illustrates a multi-dimensional temperature sensor.

Referring now to FIG. 3, the temperature controller 140 is further described. Generally, the color temperature of the object 120 or a portion of the object is determined using the spectrophotometric temperature sensor 150. The illustrated example is a two-detector array system 300, which uses one or more of: a lens; a beam splitter 320; one or more optical filters, such as a first optical filter 330 and second optical filter 340; and/or one or more detectors, such as a first detector and a second detector and/or a first two-dimensional detector array 350 and a second two-dimensional detector array 360. Each of the elements of the illustrated two-detector array system 300 are further described, infra.

Achromatic Lens

Referring still to FIG. 3, the lens, which is preferably an achromatic lens 310, is further described. Heat, light, and/or infrared light from the current deposition layer, recently sintered powder, and/or localized melted material enters the two-detector array system 300, such as through the lens. As illustrated an achromatic lens 310 is used to focus the heat onto one or more detector elements. The lens is preferably an achromatic lens 310 or achromat, where the achromatic lens 310 is a corrected lens designed to focus two or more distinct wavelength regions or colors onto one plane, which limits chromatic and/or spherical aberration.

Beam Splitter

Referring still to FIG. 3, heat from the achromatic lens enters the beam splitter 320. The illustrated beam splitter 320 uses a metal coating 322, such as a 50/50 reflectance/transmittance coating sandwiched and/or glued between a first glass cube diagonal half 324 and a second glass cube diagonal half 324. The first and second glass cube diagonal halves 322, 324 are optionally diagonal one inch cubes of glass cut, such as cut between opposite edges of a cube. Generally, the beam splitter 320 is any optical device than splits a beam of light in two or more beams. Examples of beam splitter types include, but are not limited to, those using: a dichroic optical coating, a half-silvered mirror, a prism camera, and/or a layer thickness yielding partial internal reflection.

Optical Filters

Still referring to FIG. 3, heat and/or light from the beam splitter 320 subsequently transmits along a first path through the first optical filter 330 and along a second path through the second optical filter 340. In one case, the first optical filter 330 is a 750±25 nm bandpass filter and the second optical filter 340 is a 900±25 nm bandpass filter, which are good for monitoring small temperature differences, such as less than 1, 5, 10, 20, or 30° C. at about 1400, 1500, 1600, 1700, 1800, or 1900° C. The two identified specific bandpass filters are designed to distinguish temperatures of 1673 and 1683° C. In another case, the first optical filter 330 and the second optical filter 340 comprises a first bandpass filter and a second bandpass filter, respectively, where the bandpass filters transmit light in two separate and optionally overlapping spectral regions with mean wavelengths of transmission separated from each other by greater than 10 nm. Indeed, as further described infra, the filters need only have different transmittance. The first and/or second optical filter 330, 340 is optionally any longpass filter, bandpass filter, shortpass filter, notch filter, step-filter, or material absorbing light anywhere in a range detected by the corresponding first detector and second detector. Indeed, only one filter is optionally used in the absence of a second filter as the two light paths yield differences in light throughput as a function of temperature, as further described infra. Yet still further, the temperature determination, described infra, also works with no optical filters and/or identical optical filters if the two detectors are of two types having different relative response as a function of wavelength and/or at at least one wavelength.

Detectors

Still referring to FIG. 3, light along the first path 327 is detected using a first detector and light along the second path 328 is detected using a second detector. The difference in detected light between the first detector and the second detector relates to the temperature of the object.

Temperature Determination

Figure 4:
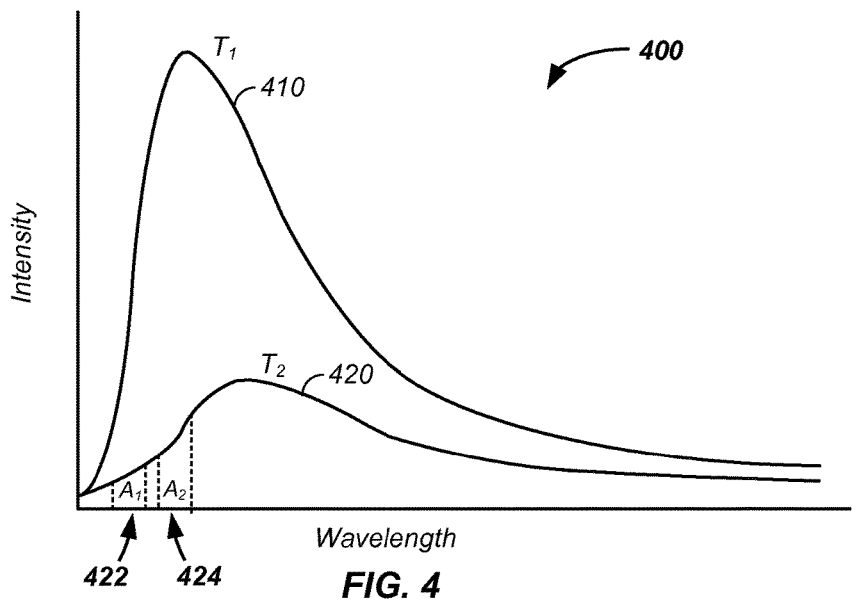
FIG. 4 illustrates a multi-spectral region temperature analysis.

Referring now to FIG. 4, two black-body curves are illustrated, where emitted electromagnetic radiation 400 follows Plank's Law and where the spectrum of the emitted light is a function of temperature. As illustrated, two blackbody curves are illustrated at a first temperature 410, $T_1$, and a second temperature 420, $T_2$. Generally, two black body spectra, such as the illustrated first temperature 410 and a second temperature 420 have shifted intensity profiles. More particularly, two blackbody curves of different temperature have peak intensities at different wavelengths, differ rising intensity profile shapes or slopes at shorter wavelengths, and different falling intensity profile shapes or slopes at longer wavelength relative to the peak intensity. Thus, by sampling different, optionally overlapping, spectral regions, such as with a optical filter-first detector combination and a second optical filter-second detector combination, a comparison of responses of the first detector and the second detector equates with a given temperature, such as maintained in a look-up table or calculated on the fly using one or more blackbody equations. Referring now to FIG. 3 and FIG. 4, as illustrated, the first optical filter 330 passes light from a first blackbody area over a first wavelength range, which is subsequently detected by the first detector and is represented by the first area, $A_1$, under the second blackbody curve. Similarly, the second optical filter 340 passes light from the same first blackbody area over a second wavelength range, which is subsequently detected by the second detector and is represented by the second area, $A_2$, under the same second blackbody curve. Mathematically comparing the first signal, represented as $A_1$, and the second signal, represented as $A_2$, yields the temperature of the blackbody. In a non-limiting example, the ratio of the areas is proportional to temperature, equation 1. In equation 1, the ratio of the first area to the second area yields a value that corresponds to a temperature, such as pre-recorded into a lookup table relating the ratio of the areas or intensities to the blackbody curve shape at known temperatures. More generally a mathematical comparison of intensity response of two or more detectors relates to temperature, where equation 1 is illustrative of many possible mathematical comparisons.

$$\frac{A_1}{A_2} \sim T \qquad \text{(eq. 1)}$$

Linear/Two-Dimensional Detector Arrays.

As seen in the previous paragraph, comparing light intensities is used to determine the temperature of an imaged area or spot. Hence, comparing imaged light along two linear detectors arrays yields a linear temperature profile or vector of temperatures along the imaged area by comparing responses of individual detector elements, of the first detector and the second detector, imaging the same imaged area or spot. Similarly, as illustrated in FIG. 1 and further illustrated in FIG. 7, by aligning the two two-dimensional arrays 350, 360 to image, preferably element by element, the same points of the object 120 or object sub-layers, mathematical comparison of the resultant signals for each paired element yields a two-dimensional temperature array, $T_{(x,y)}$, of the imaged sub-layer. Hence, a spot being sintered by the laser 130 is monitored by the described two-detector array system 300 without required movement of any optic, such as the intervening optic, where the spot being sintered is changed/scanned as a function of time. Similarly, if two or more lasers are sintering in parallel in time, then the two two-dimensional array system 300 allows simultaneous monitoring sintering events from each of the two or more lasers. further, the two two-dimensional array system 300 allows monitoring of sintering at the current spot being lased and at spots recently lased, such as described infra. Optionally and preferably the detectors collect signal at faster than 1, 10, 100, 500, or 1000 Hz. Optionally, the detector detect signal anywhere in the infrared from 700 to 10,000 nm; preferably in the range of 700 to 1000 nm.

Melt Analysis

Figure 5:
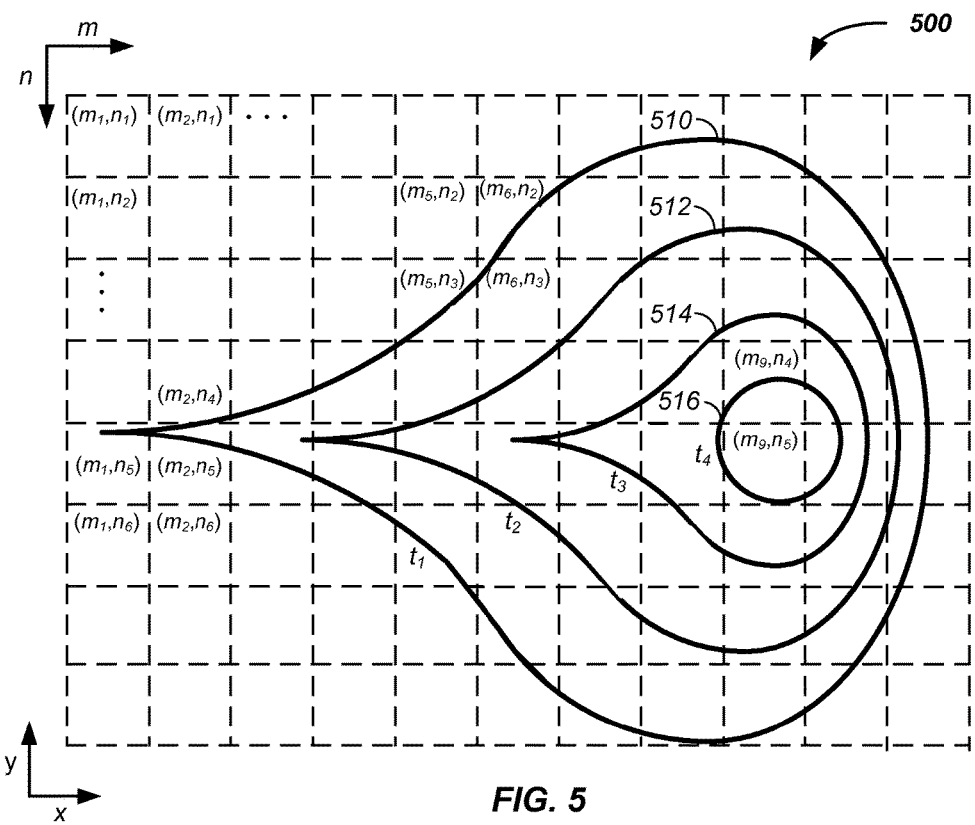
FIG. 5 illustrates a trailing temperature plume.

Referring now to FIG. 5, a first quality/feedback analysis of a localized laser induced melt pool 122 of/on the object 120 with a translating laser spot 500 is provided. Generally, iso-temperature lines of a sub-layer of object are represented as the laser 130 is scanned across the x-axis. As illustrated, the laser is currently heating a fourth area 516 at a fourth time, $t_4$. The fourth area is approximately the shape of the laser beam radial cross-sectional area, such as a circle. At previous times, $t_3$, $t_2$, $t_1$, the laser was progressively further away from the current position along the x-axis. The first, second, and third comet tail iso-temperature profiles 510, 512, 514 represent the combination of previous heating from the laser scanning along the x-axis, heating conduction from a nearby region, and/or cooling of the melt pool as a function of time. The actual geometric shape of the melt pool and/or the iso-temperature profiles is controlled by the energy delivered by the laser(s), the time upon which the energy is delivered, the scan speed of the laser, the deposited material(s), the state of underlying layers, and/or the local environment. The actual teardrop shape of the iso-temperature profiles is illustrative of any geometric shape of the iso-temperature lines, such as circular, elliptical, oval, or complex. Importantly, the ability of the two two-dimensional array system 300 to image temperatures in a two-dimensional array, the x/y-plane as illustrated, allows analysis of a total energy delivered to the material by the laser 130 and/or a cooling rate of the melt pool by analysis of the temperatures determined by the two two-dimensional array system 300 as a function of time using the process of analyzing the melt 172 subroutine, described supra. Essentially, the ability to measure temperatures along two axes as a function of time allows analysis of the heating and cooling process that is not provided by a system that does not acquire a two-dimensional temperature profile of the surface of the object as a function of time. The heating and/or cooling analysis is used: (1) in a feedback to the laser 130 of the additive manufacturing device 100, (2) in a quality control step for acceptance or rejection of the object 120, and/or (3) to measure effective depth of melting of the melt pool.

Still referring to FIG. 5, analysis and/or monitoring of the object 120 during construction of the object 120 in terms of current lasing position, melt pool, cooling rate, and/or freezing as a function of temperature and position is described. Generally, the spectrophotometric temperature sensor 150, comprising at least one two-dimensional detector array, images an imaging plane relative to the working platform 112, such as above and parallel to the working platform. In the non-limiting illustration of FIG. 5 provided for clarity of presentation, the spectrophotometric temperature sensor 150 images m by n positions of the imaging plane, where m and n are positive integers greater than 2. Optionally and preferably, the m by n imaged areas correspond to individual elements of the two-dimensional detector array or groups of elements of the two-dimensional detector array. Imaged areas of the object 120 associated with corresponding elements of the two-dimensional detector array of the spectrophotometric sensor 150 allow simultaneous data collection for real-time and/or subsequent analysis of the current lasing position, melt pool, cooling rate, and freezing of the forming/formed object as a function of position. Several non-limiting examples are provided to further clarify the analysis and/or monitoring of the object 120. In the provided examples, the m by n imaged areas of the object 120 correspond to m by n detector elements of at least one optically coupled two-dimensional detector array though it is recognized that the m by n imaged areas are optionally imaged by any number of detector elements with corresponding changes to performance of the spectrophotometric temperature sensor, such as cost, readout time, and resolution.

Example I

Still referring to FIG. 5, a first example of analyzing/monitoring the current lasing position is provided. As illustrated, a first currently lased region is analyzed at a first position, $(m_9,n_5)$, which analysis shows to have a high temperature correlated to current lasing. As illustrated, a neighboring region is analyzed at a second position, $(m_9,n_4)$, which analysis shows to have a slightly lower temperature than the high temperature first position, $(m_9,n_5)$, indicating that only part of the second position, $(m_9,n_4)$, is being actively lased. Similarly, analysis of nearby object positions/camera pixels relative to the determined hottest position, such as within 1, 2, 3, or more pixel signals, allows a map of the shape and size of the currently lased position.

Example II

Still referring to FIG. 5, a second example of analyzing/monitoring a radial cooling position is provided, such as along the y-axis. As illustrated, a second currently lased region is analyzed at a representative third position, $(m_6,n_2)$, at a fourth position, $(m_5,n_3)$, at a fifth position, $(m_6,n_3)$, and at a sixth position, $(m_5,n_2)$. Analysis of the third and fourth positions indicates: (1) radial or y-axis heating locations relative to the first, currently lased, position, (2) a lower relative or cooled temperature relative to the currently lased position, and (3) a portion of an iso-temperature line as the third and fourth positions have equal or essentially similar temperatures. As illustrated, a neighboring radially inward fifth position, $(m_6,n_3)$, shows both: (1) a higher temperature than the radially outward third and fourth positions and (2) a lower temperature than the radially and laterally inward first and second positions. Similarly, the sixth position, $(m_5,n_2)$, shows a still lower temperature than the third and fourth positions, such as a freeze temperature of the cooling metal or alloy. Similarly, analysis of nearby object positions/camera pixels relative to pixels related to a portion of an iso-temperature line, such as within 1, 2, 3, or more pixels, allows a map of the shape and size of a radially cooling zone and/or a freezing zone.

Example III

Still referring to FIG. 5, a third example of analyzing/monitoring a lateral cooling position is provided, such as along the x-axis. As illustrated, a seventh, $(m_2,n_4)$, an eighth position, $(m_2,n_5)$, and a ninth position, $(m_1,n_5)$, represent laterally trailing positions from the currently lased position and/or previously lased positions of the object. Analysis of the temperature of the seventh, eighth, and ninth positions yields information on: (1) lateral residual heat, (2) lateral temperature, (3) depth related residual heat, and/or (4) information on melt pool extent, shape, and/or geometry. Similarly, analysis of temperature of a tenth position, $(m_1, n_6)$, and eleventh position, $(m_2,n_6)$, yields information on still further removed radial and lateral positions, such as relative to any and all of the first nine positions.

Still referring to FIG. 5, from the previous three examples it is observed that many areas of the melt pool are optionally analyzed at the same time using different areas of the two-dimensional detector array of the spectrophotometric temperature sensor 150 optically imaging corresponding areas of the object 120. Information from each pixel or set of pixels of one or more two-dimensional detector arrays is optionally and preferably merged to yield spatial and/or temporal information on a larger surface area of the object in terms of temperature, which is optionally and preferably monitored as a function of time, to yield any of: (1) total melt time of a region and/or volume of the object 120 and/or (2) cooling rate of an area and/or volume of the object 120. Indeed, as each two-dimensional image of the object 120 represents a snapshot in time, as the snapshots are preferably collected at a rate faster than a targeted zone of the laser moves, and as the laser or multiple lasers scan the object as a function of time and in layers, a three-dimensional data cube of information is optionally and preferably generated revealing information on any of: (1) sub-layers heating contribution to a given volume of the object 120 through use of knowledge of conduction, (2) a sub-layer volume temperature of the object 120 as a function of time, and (3) a cooling rate of a volume of the object 120. In addition, the two-dimensional images collected as a function of time are optionally used to track a multitude of lasing positions as a function of time, such as from more than 1, 2, 3, 4, 5, 10, 20, 50, or more simultaneous lasing positions with one or more types of lasers in terms of wavelength used for heating.

Figure 6:
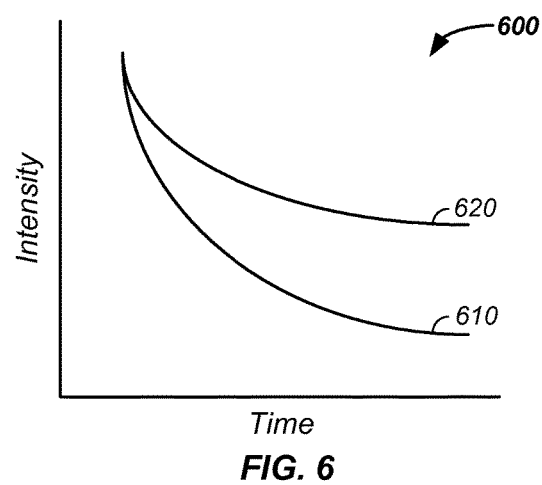
FIG. 6 illustrates cooling profiles.

Referring now to FIG. 6, a second quality/feedback analysis of a melt pool 122 of the object 120 at a fixed position 600 is provided. In the provided example, a first observed intensity 610, such as from the first detector, along with a second observed intensity 620, such as from the second detector, as a function of time is provided. The decrease in intensity correlates with cooling at the site. The signal from the first detector, the signal from the second detector, and/or a mathematical comparison of the first observed intensity 610 and the second observed intensity, such as described supra, is an additional measure of heating and cooling of the melt pool, which again relates to total energy delivered by the laser 130 and/or depth of melting of the metal at the analyzed location. The inventor has determined that analysis of the melt pool depth for one or more sub-layers allows critical information on uniformity and/or bonding of the various sub-layers, which is difficult to determine on the overall part once completed. Further, the cooling rate determines the amount of time the metal is in liquid form. The time a metal is in a given state changes the final structure of the metal. Thus, the melt pool depth and/of cooling rate is used to drive the final form of the metal when the material drops below a chemistry based temperature of the metal/allow and "freezes". The analysis allows dynamic correction of the melt pool by directing the laser for additional heating of one or more locations and/or allows after-the-fact analysis of the object 120 using recorded multi-axes temperature profiles. As with the first example provided in the previous paragraph, the process of analyzing is optionally done with the melt 172 subroutine as a feedback control to the laser 130 and/or in a quality control step.

Dimensions

Referring again to FIG. 5, the dimensions observed by the spectrophotometric temperature sensor 150 are optionally the entire surface of a given layer material 114 of object 120 on the platform 112, which is optionally greater than 10, 50, 100 square inches, or is a smaller area of a given layer, such as about a current melt pool 122 of the object 120. When analyzing the melt pool 122 or localized cooling region about the melt pool, the analyzed area has x- and/or y-lengths of less than about 30, 20, 10, 5, 1, ½, ¼ mm. In one case, the laser 130 yields a linear melt line of about 100 to 200 micrometers in width. In this case, the spatial resolution of the spectrophotometric temperature sensor 150 is preferably less than the melt width, such as less than about 150, 100, 50, 20, or 10 micrometers. Further, particle sizes of the material are optionally in a 1 to 100 micrometer range, preferably in a 5 to 50 micrometer range, and still more preferably in a 10 to 40 micrometer range. Thus, the spectrophotometric temperature sensor 150 or the two-detector array system 300 preferably has a spatial resolution of less than 50, 20, 10, 5, 2, or 1 micrometer to spatially resolve particles being melted.

Optionally, at the same time that local heating by the laser is being observed on the micrometer scale, cooling of a much larger region is being observed, such as a side and/or top view of great than 1, 2, 3, 4, 5, 10, 20, 50, or 100 square inches. The inventor has determined that monitoring and controlling via feedback the localized heating of the laser allows first information, such as heating and melting, and monitoring a larger area over the same time period allows second information, such as cooling rate and total duration of heated material above the "freeze" temperature.

It is noted herein that the array-detectors described herein are used to acquire images that have the above noted spatial resolution and optionally acquire spectral information for each pixel or sets of pixels. A system that does not acquire a spatially resolved image only sees an average condition of the system and not localized effects, such as melt pool size and/or local cooling rates.

Multi-Axes Analysis

Figure 7:
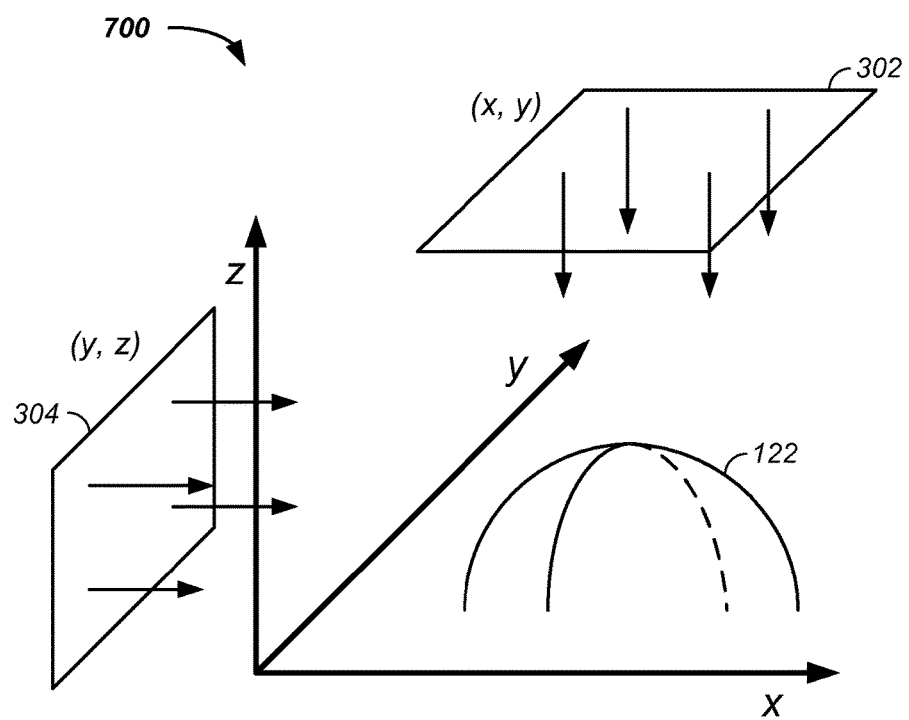
FIG. 7 illustrates top and/or side temperature imaging.

Referring now to FIG. 7, the temperature controller 140 is illustrated using a first top down x/y-axes optical interface 302 and/or a second lateral y/z-axes optical interface 304. In previously described examples, supra, the interface of the temperature controller 140 is orientated downward along the z-axis and images of the x/y-plane are obtained. Generally, the two-dimensional axes system imaged with the general temperature controller 140 and/or the detailed two two-detector array system 300 is optionally along any two axes defined in an x-, y-, z-coordinate system. Optionally, two or more interfaces are simultaneously used, such as the top down x/y-axes optical interface 302 and the lateral y/z-axes interface 304, where the top down x/y-axes optical interface is optionally coupled to a first sub-analyzer and the lateral y/z-axes interface is optionally coupled to a second sub-analyzer, each of the first and second sub-analyzer optionally comprises any and/or all of the elements of the additive manufacturing device 100. The lateral y/z-axes optical interface 304 allows an analysis of heating, cooling, and/or lateral or radial extent of cooling of the side of the current melt pool 122 of the object 120. For example, the slope of the cooling curve or the change in slope with position or time of the cooling curve is related to total depth and/or breadth of the melt.

In one embodiment, the temperature controller 140 is passive and measures the heating and/or cooling process. In another embodiment, the temperature controller 140 is programmable and used to provide feedback information to the additive manufacturing device 100 to set/control localized heating temperatures and/or localized temperature maintenance. For example, multiple layers of the object are optionally individually laid down at a set temperature or within a controlled temperature range by using information from the temperature controller 140 in control of the laser 130 of the additive manufacturing device. By controlling the temperature set point, the final strength of the object is controlled.

Incident Angle/Detection Angle

Figure 8A:
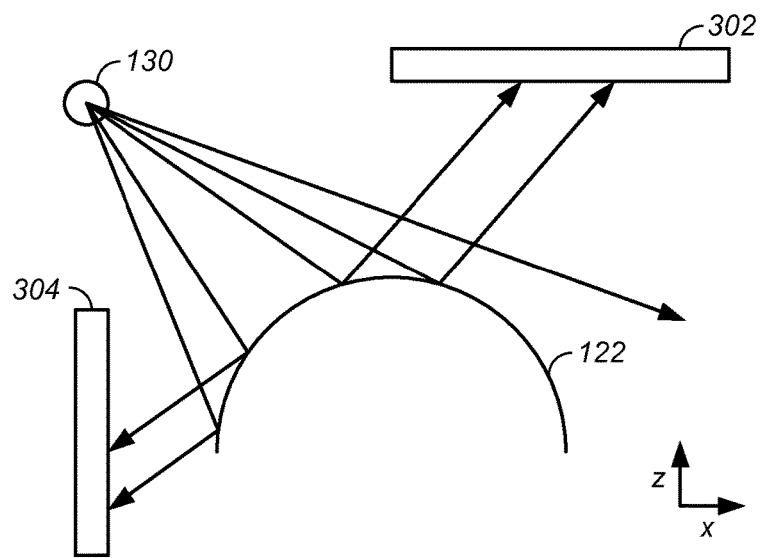
FIG. 8A and FIG. 8B illustrate a varying incident angle and reflectance angle system, respectively.
Figure 8B:
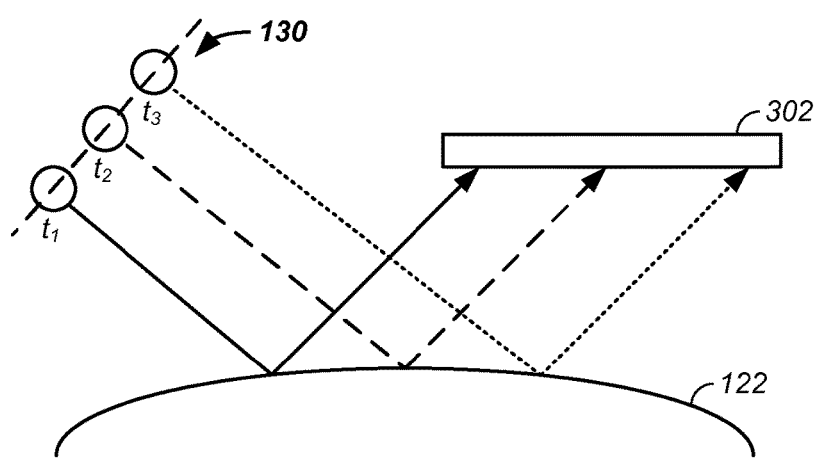

Referring now to FIG. 8A and FIG. 8B, a third quality/feedback analysis of a melt pool shape with a translating laser spot 500 is provided. Referring now to FIG. 8A, analysis of shape of the melt pool 122 of/on the object 120 is illustrated. In one example, signal is received by a first detector array and/or a second detector array, such as a detector orientated with optional intervening optics 160 to view from the top down an x/y-axes or laterally the y/z-axes of the melt pool, respectively. The detected signal, which is: (1) a spot of the laser 130 reflected off of the melt pool 122 and/or (2) heat emitted from the melt pool 122 as a function of the surface shape of the melt pool 122, is used to deduce the shape of the melt pool. The deduced shape yields information on the thoroughness, radial extent, and/or the depth of the melt pool 122. Referring now to FIG. 8B, similarly: (1) movement of position of the laser 130 and/or light from the laser relative to the melt pool 122 of the object 120 and/or (2) infrared heat light emitted from the melt pool that is subsequently detected by one or more detectors, such as the via the x/y-axes optical interface 302 is used to determine shape, extent on the x/y-plane, and/or depth of the melt pool 122. In general, intensity and/or duration of detected light by one or more two-dimensional detector is used to determine achieved temperature of the melt, cooling time of the melt, depth of the melt, radial penetration of the melt, and/or the extent that the melt reaches a prior sub-layer and hence bonding of a momentary top sub-layer with a secondary sub-layer under the momentary top sub-layer.

In the examples provided, supra, the temperature controller 140 uses the spectrophotometric temperature sensor 150 and optionally one or more intervening optics 160 that are in a fixed position relative to the object 120 and/or the working platform 112. However, the fixed position examples are additionally representative of a cases where the temperature sensor travels with the laser beam. For example, one or more of the intervening optics and/or the temperature sensor travel, rotate, and/or tilt with the laser beam and are thus collinear, co-axial, and/or parallel to the moving laser beam with time.

In the examples provided, supra, the temperature controller 140 uses the spectrophotometric temperature sensor 150 and optionally one or more intervening optics 160 to measure/monitor the object 120 being generated using a screed. However, the temperature controller 140 is optionally used to measure any additive manufacturing process, such as directed energy deposition and/or any system of depositing one or metal powders to a localized area/spot for simultaneous or nearly simultaneous treatment with a laser. For example, the temperature controller 140 is optionally used to monitor heating resultant from a laser with one or more particle streams being fed into the laser path, optionally as the laser is scanned though space to create a 3-dimensional object.

Still yet another embodiment includes any combination and/or permutation of any of the elements described herein.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. A method for determining a temperature of an object under construction, comprising the steps of:
    providing an additive manufacturing device configured to construct the object comprising:
        a working platform holding the object under construction; and
        a temperature sensor, comprising:
            a first two-dimensional detector array optically linked to a plane parallel to a surface of the working platform; and
            a second two-dimensional detector array optically linked to the plane parallel to the working platform;

generating a first set of signals using said first two-dimensional detector array;
generating a second set of signals using said second two-dimensional detector array; and
using a controller to calculate a set of temperatures using said first set of signals and said second set of signals.

2. The method of claim 1, further comprising the steps of:
depositing a powder on the plane parallel to the surface of the working platform using a screed of said additive manufacturing device;
sintering the powder generating a melt pool of melted powder using a laser of said additive manufacturing device;
sensing the melt pool using said temperature sensor;
using the calculated set of temperatures in a step of at least one of:
controlling said laser; and
determining a quality of sintering of the object;
said controller using the calculated set of temperatures in a feedback control loop to redirect said laser to further lase a previously lased position of the object.

3. The method of claim 1, further comprising the step of:
prior to said step of sensing, aligning said first two-dimensional detector array to image on a detector element by detector element level a same position of the object observed by said second two-dimensional detector, said set of temperatures corresponding to individual imaged locations of the object imaged by elements of the first two-dimensional detector.

4. The method of claim 1, further comprising the step of:
within a period of less than one second, monitoring at least two locations of the object at least three millimeters apart using said first two-dimensional detector array and said second two-dimensional detector array, said at least two locations of the object comprising: a first object location lased using a first laser and a second object location lased using a second laser.

5. The method of claim 1, further comprising the step of:
multiplexing construction of the object via simultaneous use of a first laser, a second laser, and a third laser, respectively lasing a first position, a second position, and a third position of the object.

6. The method of claim 1, further comprising the step of:
said controller using a-priori knowledge of shape of a spectrum of a blackbody radiator as related to the first set of signals and the second set of signals to determine the set of temperatures.

7. The method of claim 1, further comprising the step of:
using said temperature sensor to monitor, within one-tenth of a second, at least two sintering locations sintered by a corresponding at least two lasers of said additive manufacturing device, wherein a first laser of said at least two lasers sinters a first location of said at least two sintering locations simultaneous with a second laser of said at least two lasers sintering a second location of said at least two sintering locations.

8. The method of claim 1, further comprising the step of:
using each of said first-two dimensional detector array and said second two-dimensional detector array to simultaneously monitor a current sintering location at the head of a teardrop iso-temperature shape of a current melt pool of the object with a first set of pixels and at least one previously sintered location at a tail of the teardrop iso-temperature shape of the melt pool of the object with a second set of pixels to determine at least a cooling rate of a section of the object.

9. The method of claim 2, further comprising the step of:
recording data from both said first two-dimensional detector array and said second two-dimensional detector array; and
using said data to determine a cooling parameter of the melt pool of the object after lasing with a laser of said additive manufacturing device.

* * * * *